United States Patent [19]

Yokogawa

[11] Patent Number: 5,111,443
[45] Date of Patent: May 5, 1992

[54] OPTICAL RECORDING APPARATUS

[75] Inventor: Fumihiko Yokogawa, Saitama, Japan

[73] Assignee: Pioneer Electronic Corporation, Tokyo, Japan

[21] Appl. No.: 745,966

[22] Filed: Aug. 12, 1991

Related U.S. Application Data

[63] Continuation of Ser. No. 344,886, Apr. 28, 1989, abandoned.

[30] Foreign Application Priority Data

Nov. 2, 1988 [JP] Japan ............................... 63-278200

[51] Int. Cl.$^5$ .............................................. G11B 7/00
[52] U.S. Cl. ....................................... 369/54; 369/48; 369/59
[58] Field of Search ................... 369/59, 54, 109, 133, 369/47, 48, 49

[56] References Cited

U.S. PATENT DOCUMENTS

| 4,734,900 | 3/1988 | Davie | 360/51 |
| 4,797,872 | 1/1989 | Rokutan | 369/59 |
| 4,873,680 | 10/1989 | Chung et al. | 369/54 |
| 4,937,809 | 6/1990 | Miyadera et al. | 369/116 |
| 4,989,196 | 1/1991 | Ishikawa et al. | 369/59 |
| 4,998,237 | 3/1991 | Osakabe et al. | 369/59 |

*Primary Examiner*—Roy N. Envall, Jr.
*Assistant Examiner*—Nabil Hindi
*Attorney, Agent, or Firm*—Sughrue, Mion, Zinn, Macpeak & Seas

[57] ABSTRACT

A pulse width adjustment circuit for an optical disk recording system selectively adjusts the width of pulses to be recorded in dependence upon an input control signal, which in turn is dependent upon the width of the pulse to be adjusted. In one embodiment a minimum bit length pulse is widened and all other pulses are narrowed. This is useful in recording on the inner portions of a CAV optical disk. In another embodiment a selectable control signal determines whether the minimum bit length signal is to be narrowed or widened.

8 Claims, 7 Drawing Sheets

OPTICAL RECORDING APPARATUS

This is a continuation of application Ser. No. 07/344,886 filed Apr. 28, 1989, now abandoned.

BACKGROUND OF THE INVENTION

The present invention relates to optical recording apparatuses for recording pulse signals on optical record mediums.

FIG. 7(A) shows pits recorded on an optical disk and an output RF (high frequency) signal waveform produced by a pickup means (not shown) when the pits are read. The length and distance of each pit respectively correspond to data lengths of signal portions "1" and "0" of a recorded digital signal which is not shown in this figure. For example, pit 1T corresponds to unit bit length "1" of the digital data signal and pit 3T corresponds to bit length "111" of the digital data signal and the length of pit 3T is correspondingly three times that of pit 1T.

A synchronization signal is separated from the above RF signal and is supplied to an unillustrated PLL (phase locked loop) circuit, thereby providing a data-demodulating clock signal which is synchronized with the above synchronization signal and follows the change in time axis of the above RF signal. Through use of the clock signal, the signal is sample-held and A/D converted and demodulated to a bi-value signal indicative of value "0" or "1". This sampling timing and the respective values are shown by the arrows in FIG. 7(A).

The length of the pit recorded on a CAV (constant angular velocity) disk is relatively long on the outer circumferential side of the disk, and the distance between the respective pits is also relatively long. In such a region, the amplitude of the RF signal outputted from the pickup sufficiently exceeds a predetermined judging level even in a signal portion having a unit pit length. FIG. 7(A) may be considered as representing pits recorded on the outer areas of a CAV disk.

However, for digital signals recorded on the inner circumferential portion of an optical disk, as shown in FIG. 7(B), the length of each pit and the distance between the respective pits is relatively narrow. When the pit length is shorter than a certain length the contrast in reflected light of a light beam returned from the pit in an optical pickup system is lowered. Thus, as shown in FIG. 7(b), since the output of the pickup is reduced, the signal portion corresponding to a pit having a unit pit length has an insufficiently low voltage level.

Accordingly, the difference in voltage level between adjacent signal portions corresponding to level "0" is reduced so that the so-called jitter margin with respect to the change in time axis of the clock signal is reduced.

A prior circuit as shown in FIG. 8, for adjusting the width of a pulse prior to recording on an optical disk is used to increase the above jitter margin.

In FIG. 8, input digital signal P having a waveform as shown in FIG. 9 is delayed by signal delay circuit 41 by predetermined time t to obtain delay signal Q. Delay time t is set such that this delay time does not exceed a time corresponding to the unit bit length (minimum time length) so as not to change the information content of the signal. A logic product operation between input digital signal P and delay signal Q is performed by AND gate 42 to obtain output signal R having a pulse width which is narrower by time t than the pulse width of input digital signal P. Further, a logic sum operation between input signal P and delay signal Q is performed by OR gate 43 to obtain output signal S having a pulse width which is wider by time t than the pulse width of input digital signal P.

Pickup position detecting circuit 45 is constructed by e.g., a potentiometer, a position detecting switch, and other conventional means, and detects the radial position of the pickup relative to the disk. When pickup position detecting circuit 45 detects that the pickup is located on the outer circumferential portion of the disk, pickup position detecting circuit 45 causes signal selecting switch 44 to transmit output signal R to an output terminal thereof. When pickup position detecting circuit 45 detects that the pickup is located on the inner circumferential portion of the disk, pickup position detecting circuit 45 causes signal selecting circuit 44 to transmit output signal S to the output terminal thereof.

Thus, when the pickup is located adjacent the inner circumferential portion of the disk, the pulse width of the record digital signal is widened and the length of the unit pit can be longer by the above-mentioned pulse width adjusting circuit.

However, the above-mentioned pulse width adjusting circuit increases not only the pulse width of the minimum bit portion of the digital signal but also the pulse width of the other bit portions of the digital signal so that an unrecorded area between the pits recorded on the disk becomes relatively narrow and the interference between codes is increased as a whole.

SUMMARY OF THE INVENTION

Accordingly, an object of the present invention is to provide an optical recording apparatus for securing a predetermined jitter margin in a sampling operation of the RF signal without causing any interference between codes.

To attain the above object, an optical recording apparatus is provided for recording a plurality of pulse signals that are altered in pulse width by a minimum time length. The apparatus comprises pulse signal time length detecting means for outputting a detecting signal when the length of said pulse signal is less than a predetermined time length and time axis extending means for extending the width of said pulse signal having less than said minimum length.

As an alternative the apparatus comprises pulse signal time length detecting means for outputting a detecting signal when the length "1" of said pulse signal is less than a predetermined time length, and time axis shortening means for shortening the pulse signals having the minimum length "1".

As another alternative the apparatus comprises pulse signal time length detecting means for outputting a detecting signal when length "1" of said pulse signal is less than a predetermined time length, time axis extending-shortening means for extending or shortening the pulse signals having length "1" with respect to the time axis according to said detecting signal within said minimum time length, and switching means for performing a switching operation with respect to either one of the extending and shortening operations of said time axis extending-shortening means.

DETAILED DESCRIPTION OF THE PREFERRED EMBODIMENTS

Figure 1:
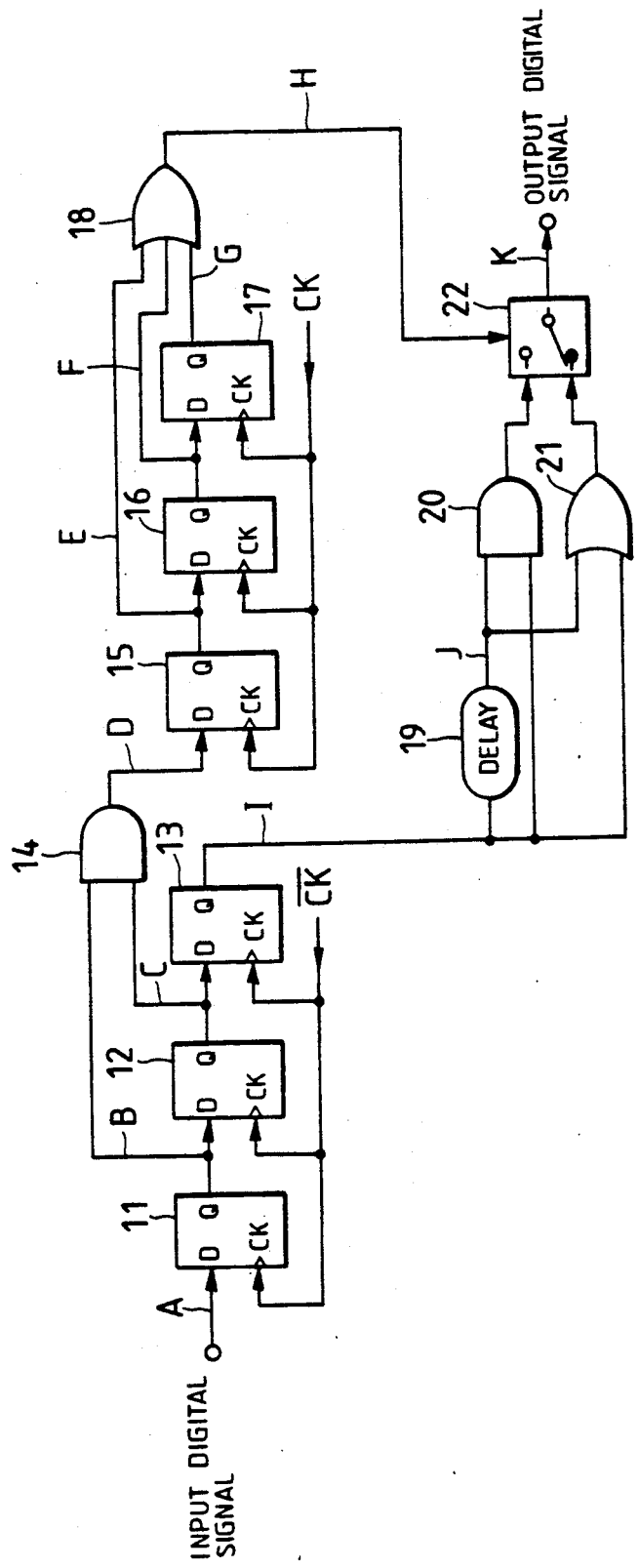
FIG. 1 is a block diagram of an optical recording apparatus in accordance with an embodiment of the present invention.
Figure 2:
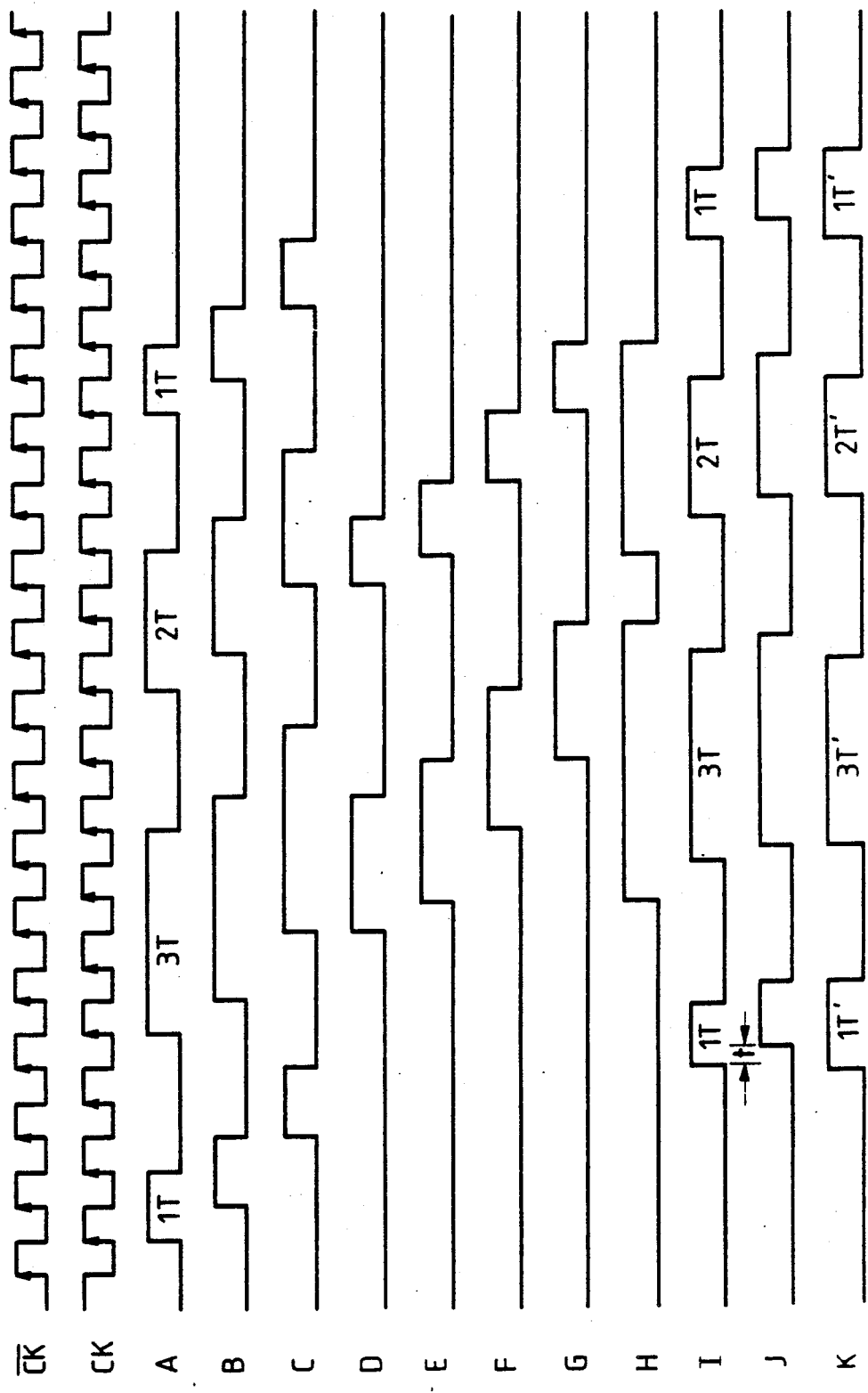
FIG. 2 illustrates signal waveforms for explaining the operation of the apparatus in the embodiment shown in FIG. 1.

With reference to FIGS. 1 and 2, input digital signal A is supplied to a signal delay circuit in which D-flip flops (each of which is called D-FF in the following description) 11 to 13 are connected in series to each other. The widths of high and low levels in voltage of each pulse constituting input digital signal A correspond to sequential values "1" and "0", respectively. For example, pulse width 1T having a minimum time length corresponds to minimum bit length "1" of a digital code signal. Pulse width 2T corresponds to bit length of sequence "11" of the digital code signal and pulse width 3T corresponds to bit length or sequence "111" of the digital code signal. In this embodiment, both the minimum bit length of the code signal and the unit bit length constituting this code signal are "1". Clock signal $\overline{CK}$, having a period equal to 1T, is supplied to D-FFs 11 to 13. The level at each D-input of each D-FF at the rising time of clock signal $\overline{CK}$ is held at each respective Q-output terminal of the D-FF circuits.

Figure 8:
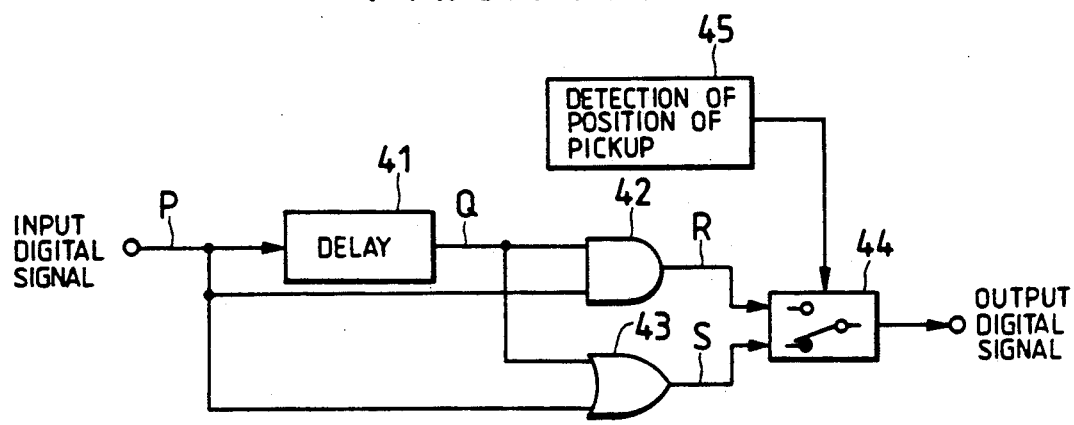
FIG. 8 is a block diagram of a conventional circuit.
Figure 9:
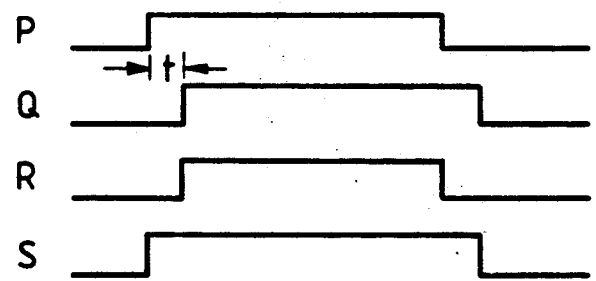
FIG. 9 illustrates signal waveforms for explaining the operation of the apparatus of FIG. 8.

Q-output signal I of D-FF 13 is delayed by 2.5 clocks with respect to input digital signal A and is supplied to a pulse width adjusting circuit constituted by circuits 19 to 21 and corresponding to that of FIG. 8. The pulse width of the output signal of AND gate 20 is reduced by time t delayed by delay circuit 19 and this output signal is supplied to a normally open input terminal of signal selecting circuit 22. The pulse width of the output signal of OR gate 21 is increased by time t delayed by delay circuit 19 and this output signal is supplied to a normally closed input terminal of signal selecting circuit 22.

Q-output signals B and C of the respective D-FFs 11 and 12 become inputs of AND gate 14 whose output signal D is a logic product of signals B and C. Q-output signal C is delayed by time 1T, corresponding to the minimum bit length of the input digital signal, with respect to Q-output signal B. Thus, if the pulse width of the digital signal A is less than time 1T, there will be no overlap of signals B and C and thus, the D signal will remain at the low level.

Signal D is supplied to a delay circuit constructed by D-FFs 15 to 17 which are operated in synchronization with clock signal CK. Q-output signals E to G of D-FFs 15 to 17 are supplied to OR gate 18 whose signal H is a logic sum of these signals. As will be understood from the circuit, and as is illustrated in FIG. 2, pulses of signal A which represent only a signal 1 length will not appear in signal H, whereas pulses of signal A representing a sequence of length "11" or longer will appear widened in signal H. Pulse width 1T corresponds to a predetermined time length. This signal H is supplied to a control input of signal selecting circuit 22 as a detecting signal. Circuits 11 to 18 constitute a means for detecting the time length of the pulse signal.

When signal H is at the low level in voltage, signal selecting circuit 22 transmits the output of OR gate 21 constituting an output for extending the pulse width to an output terminal of circuit 22. When signal H is at the high level in voltage signal selecting circuit 22 transmits the output of AND gate 20 constituting an output for shortening the pulse width to the output terminal of circuit 22. As a result, output digital signal K provided to this output terminal corresponds to a signal having a waveform in which a signal portion of pulse width 1T of input digital signal A is widened by delay time t and signal portions of pulse widths 2T and 3T of input digital signal A are narrowed by delay time t. Circuits 19 to 22 constitute a means for extending the time axis.

Figure 7A:
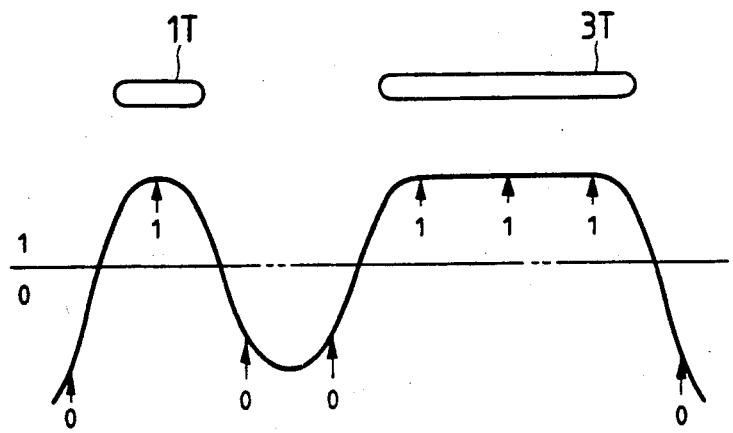
FIGS. 7(A) to 7(C) are views for explaining a pit recorded on a disk and the corresponding read signals.
Figure 7B:
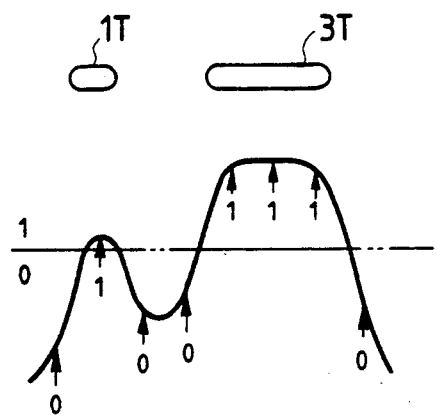
Figure 7C:
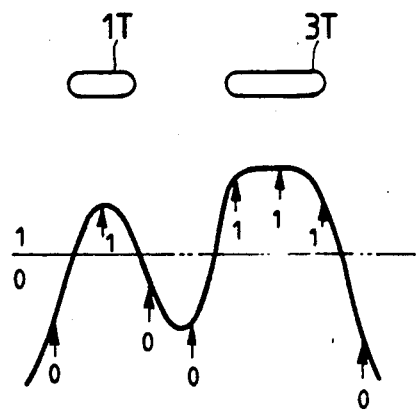

FIG. 7(C) shows a case in which the pit is recorded on the disk by this output digital signal K.

In FIG. 7(C), the length of pit 1T corresponding to pulse width 1T is increased and the length of pit 3T corresponding to pulse width 3T is reduced by this increased amount of the pit length so that the distance between these pits is not reduced. Accordingly, the RF signal outputted from a pickup which reads such pits is increased with respect to the amplitude in pit 1T so that the difference in amplitude between pits 1T and 3T is reduced. Further, since the interval of data signal "0" does not become narrow, the interference between codes or 1 bit sequences is not increased and the interval of data signal "0" is rather increased between pulses having pulse lengths which are not less than the unit data length.

Therefore, the jitter margin with respect to the above-mentioned sampling clock is increased so that the output by Modulation Transfer Functions (MTF) of the pickup is restrained from being reduced.

When the disk is made by a metallic record disk including Te (tellurium), etc.. with respect to a record face of the disk, it is known that the pit formed on the record disk by the irradiation of a light beam becomes wider than a trace of the light beam spot since the melted portion of the metal is widened. In such a case, it is necessary to narrow the pulse width of a record signal for forming pit 1T.

An example of the digital signal recording apparatus which can be used even in such a case will next be described with reference to FIG. 3.

Figure 3:
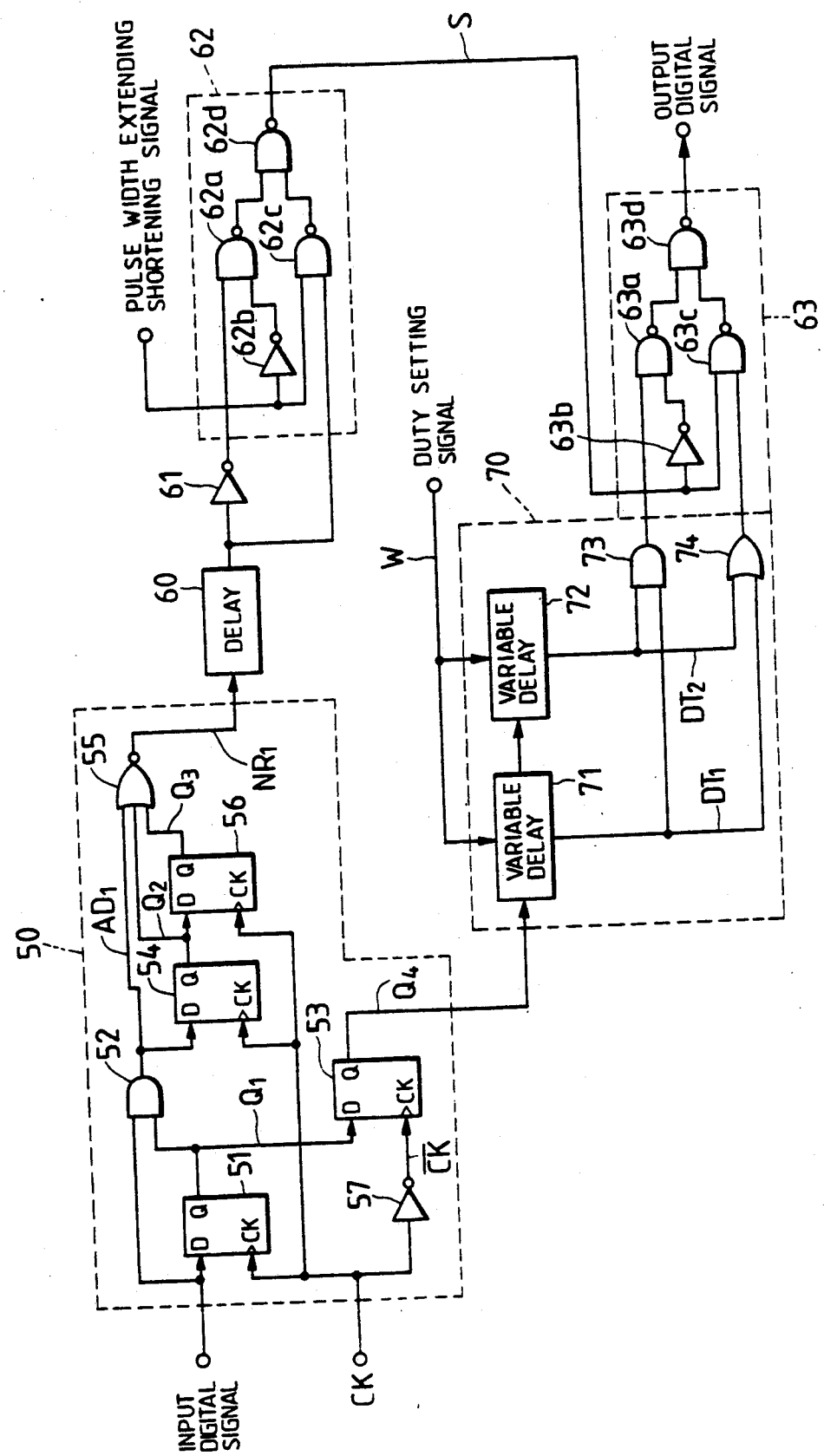
FIG. 3 is a block diagram of an optical recording apparatus in accordance with another embodiment of the present invention.

In FIG. 3, an input digital signal is supplied to D-FF 51 and one input terminal of AND gate 52. Q-output signal $Q_1$ of D-FF 51 is supplied to the other input terminal of AND gate 52 and D-FF 53. Q-output signal $Q_4$ of D-FF 53 is supplied to circuit 70 for extending and shortening the pulse width as described later. Output signal $AD_1$ of AND gate 52 is supplied to D-FF 54 and a first input terminal of three-input NOR gate 55. Q-output signal $Q_2$ of D-FF 54 is supplied to a second input terminal of NOR gate 55 and D-FF 56. Q-output signal $Q_3$ of D-FF 56 is supplied to a third input terminal of NOR gate 55. NOR gate 55 outputs logic signal "0" only when all the output signals $AD_1$, $Q_2$ and $Q_3$ are logic signal "1" and supplies this logic signal "0" to delay circuit 60 for cancelling the signal delay in pulse extending-shortening circuit 70. Clock signal CK is supplied as an operating clock signal to D-FFs 51, 54 and 56. Further, clock signal $\overline{CK}$ provided by inverting clock signal CK by inverter 57 is supplied to D-FF 53. Circuits 51 to 57 constitute a circuit for detecting pulse width 1T and correspond to a means for detecting the time length of a pulse signal.

Delay circuit 60 supplies a delay signal delayed by time 7τ, for example, with respect to signal $NR_1$ which is applied to the input of circuit 60. The delayed $NR_1$ is supplied to one input terminal of NAND gate 62c of signal selecting circuit 62. This delay signal is also inverted by inverter 61 and supplied to one input terminal of NAND gate 62a. A signal for setting the extension and shortening of the pulse width is supplied to the other input terminal of NAND gate 62c. This setting signal is inverted by inverter 62b and supplied to the other input terminal of NAND gate 62a. Both outputs of NAND gates 62a and 62c are inputted to NAND gate 62d. Output signal S of NAND gate 62d is a control signal for signal selecting circuit 63. Signal selecting circuit 62 constructed by circuits 62a to 62d supplies delay signal $NR_1$ via NAND gates 62c and 62d to output S when the setting signal for setting the extension and shortening of the pulse width is a logic "1" signal. Inverted delay signal $NR_1$ is supplied via NAND gates 62a and 62d to output S when the setting signal is logic "0" signal.

Pulse width extending-shortening circuit 70 can be constructed by a circuit disclosed in U.S. Patent Application No. 07/166,941. Namely, this circuit 70 can be constructed by variable delay circuits 71 and 72 for setting the delay time according to a duty setting signal W, and AND gate 73 and OR gate 74 for inputting both output signal $DT_1$ of variable delay circuit 71 and output signal $DT_2$ of variable delay circuit 72.

Further the constructional examples of variable delay circuits 71 and 72 will next be described with reference to FIGS. 4 and 5.

Figure 4:
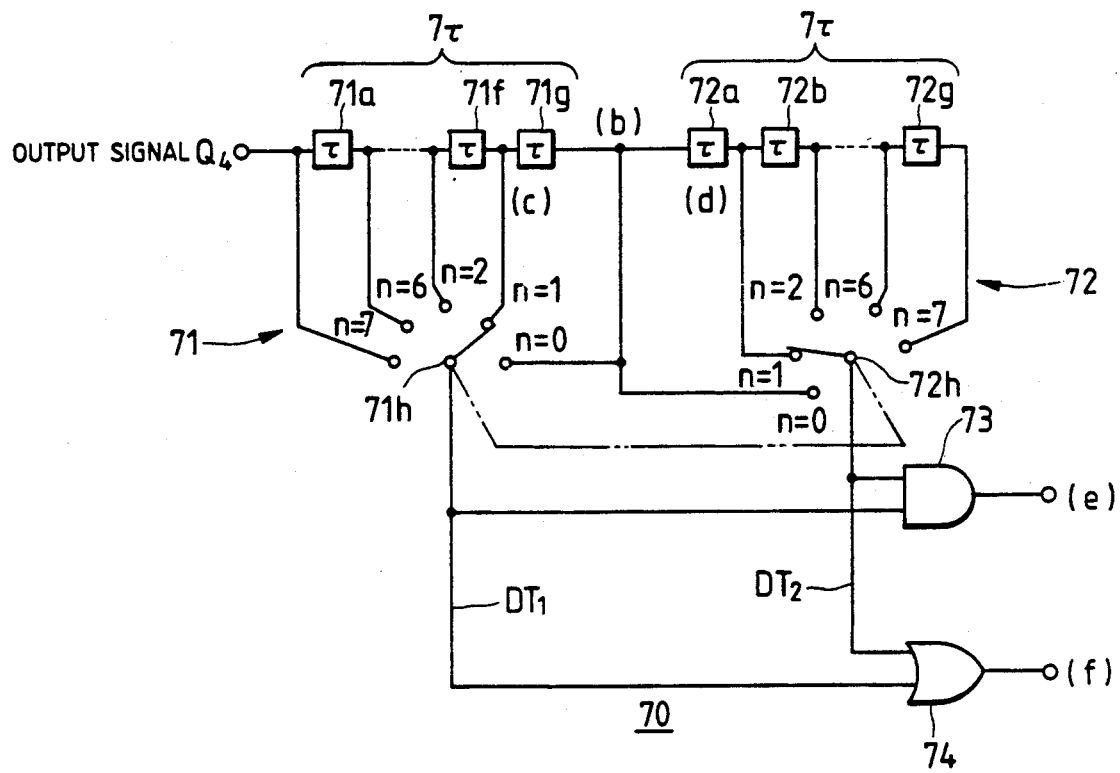
FIG. 4, is a block diagram of a circuit for extending and shortening the width of a pulse.
Figure 5:
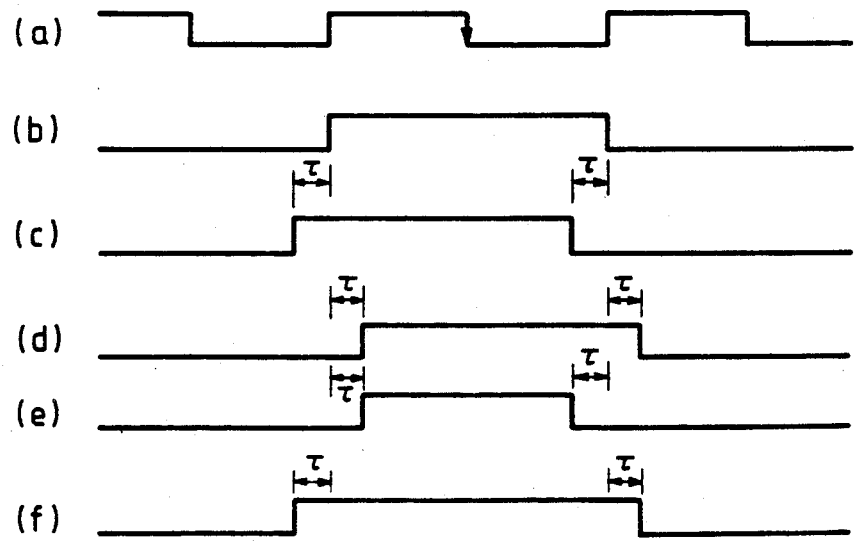
FIG. 5, consisting of (a)-(f), illustrates signal waveforms for explaining the operation of the pulse width extending-shortening circuit.

In FIG. 4. Q-output signal $Q_4$ is supplied to one terminal of delay circuits 71a to 71g connected in series to each other. Output signal (b) of delay circuit 71g is supplied to one terminal of delay circuits 72a to 72g connected in series to each other. Q-output signal $Q_4$ and respective output signals of delay circuits 71a to 71g are supplied to respective input terminals of multi-signal change-over switch 71h. Output signal (b) and respective output signals of delay circuits 72a to 72g are supplied to respective input terminals of multi-signal change-over switch 72h. Switches 71h and 72h are operated in association with each other and select input terminals in accordance with a duty setting signal. An output of switch 71h becomes output signal $DT_1$ and is supplied to AND gate 73 and OR gate 74. An output of switch 72h becomes output signal $DT_2$ and is supplied to AND gate 73 and OR gate 74.

The operation of pulse width extending-shortening circuit 70 will next be described. First, an edge of the clock signal in FIG. 5(a) is set in advance to be located in the center of the width of the output pulse of delay circuit 71g in FIG. 5(b). Accordingly, when an input of delay circuit 71g (an output of delay circuit 71f) for example is selected by switch 71h an output of switch 71h is advanced by time τ with respect to an output of delay circuit 71g (FIG. 5(c)). Similarly, an output of switch 72h (an output of delay circuit 72a) is delayed by time τ with respect to the output of delay circuit 71g (FIG. 5(d)). Accordingly the logic product and logic sum operations with respect to the outputs of switches 71h and 72h are performed by AND gate 73 and OR gate 74, thereby producing the pulse of FIG. 5(e) narrowed and the pulse of FIG. 5(f) widened by time τ with respect to leading and trailing edges.

In this case, it is possible to change the duty cycle of the pulse every time τ by selecting the output of each delay circuit by duty setting signal W. No pulse width is adjusted when n=0 is set in the input terminals of both switches. Delay time 7τ of the signal by delay circuits 71a to 71g is counter-balanced delay time 7τ by delay circuit 60.

The respective output signals of AND gate 73 and OR gate 74 are supplied to signal selecting circuit 63. Signal selecting circuit 63 is constructed by circuit elements similar to those of signal selecting circuit 62. When output signal S is logic signal "1", signal selecting circuit 63 transmits the output signal of OR gate 74 to an output terminal thereof. When output signal S is logic signal "0", signal selecting circuit 63 transmits the output signal of AND gate 73 to the output terminal thereof.

Figure 6:
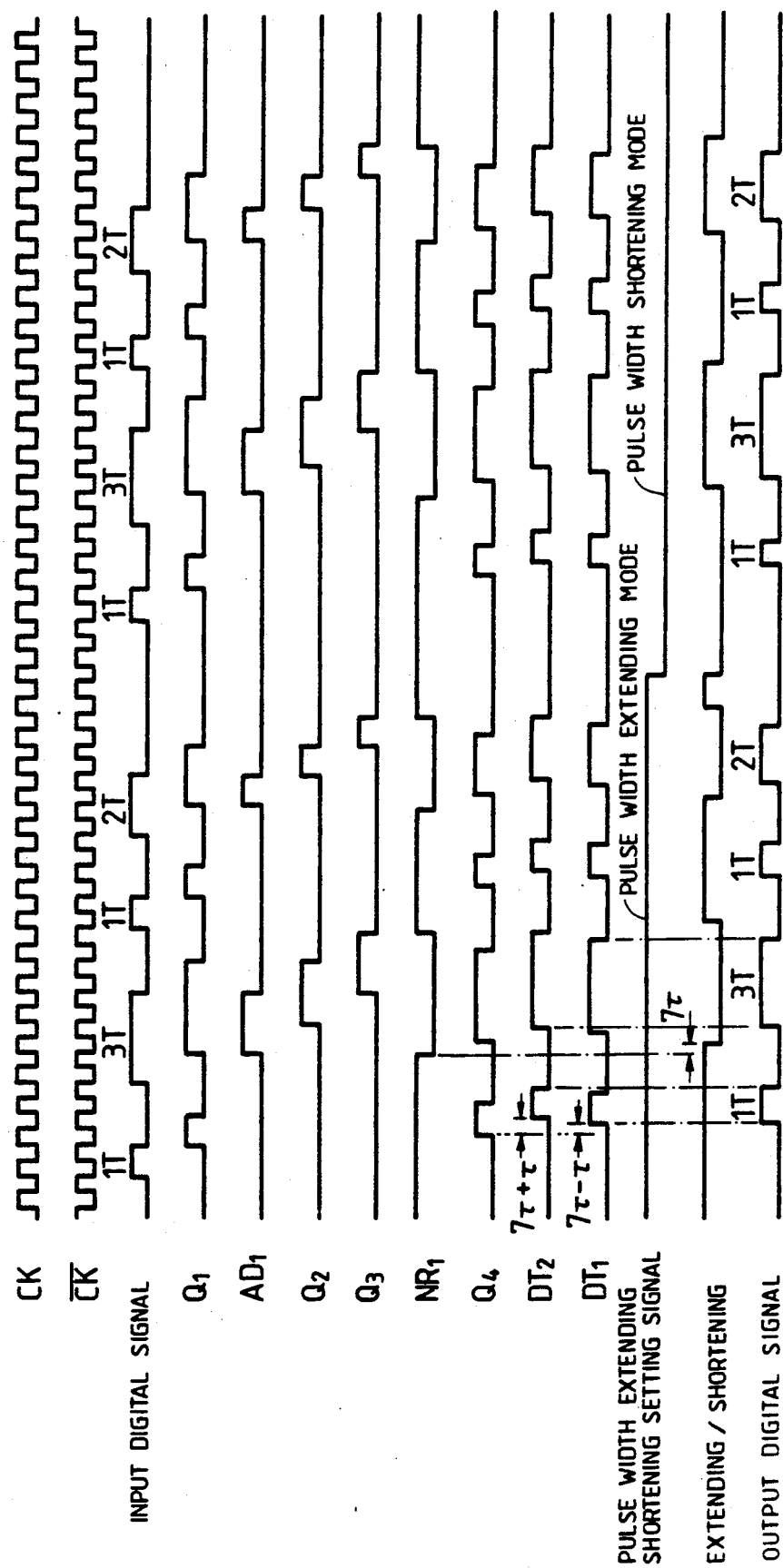
FIG. 6 illustrates signal waveforms for explaining the operation of the apparatus in the embodiment shown in FIG. 3.

The operation of the above-mentioned apparatus will next be described with reference to FIG. 6.

An input digital signal is delayed by one clock (time 1T) by D-FF 51 and Q-output signal $Q_1$ is outputted therefrom. The logic product operation with respect to this Q-output signal $Q_1$ and the input digital signal is then performed by AND gate 52. thereby providing output signal $AD_1$ in which a signal portion of pulse width 1T of the input digital signal is cancelled. This output signal $AD_1$ is delayed every one clock by D-FFs 54 and 56 and thereby Q-output signals $Q_2$ and $Q_3$ are provided. The inverted logic sum operation with respect to output signals $AD_1$, $Q_2$ and $Q_3$ is then performed by NOR gate 55 so that output signal $NR_1$ of NOR gate 55 becomes logic signal "0" in a signal portion equal to and greater than pulse width 2T of Q output signal $Q_1$ and becomes logic signal "1" in the signal portion of pulse width 1T. Output signal $NR_1$ is delayed by time 7τ corresponding to delay time 7τ of variable delay circuit 71 by delay circuit 60 and is supplied to one input terminal of signal selecting circuit 62. Further output signal $NR_1$ thus delayed is inverted by inverter 61 and supplied to the other input terminal of signal selecting circuit 62.

In the case of a pulse width extending mode for extending pulse width 1T, the signal for setting the extension and shortening of the pulse width is set to logic signal "1". At this time, signal selecting circuit 62 supplies output signal $NR_1$ delayed by time 7τ to signal selecting circuit 63 as an output signal as it is.

Q-output signal $Q_1$ is delayed by a time corresponding to half a clock by D-FF 53 and output signal $Q_4$ is thus provided and is supplied to variable delay circuit 71 of pulse width extending-shortening circuit 70. As shown in FIG. 4, when the delay time of variable delay circuits 71 and 72 is set as n=1 by duty setting signal W, output signal $DT_1$ of variable delay circuit 71 is delayed by time (7τ−τ) with respect to Q-output signal $Q_4$. Output signal $DT_2$ of variable delay circuit 72 is delayed by time (7τ+τ) with respect to Q-output signal $Q_4$. When output signal S is logic signal "1". signal selecting circuit 63 transmits the logic sum output (output of OR gate 74) of output signals $DT_1$ and $DT_2$ to the output terminal thereof so that the signal portion of pulse width 1T of Q-output signal $Q_4$ delayed by time 7τ is extended. On the other hand when output signal S is logic signal "0", signal selecting circuit 63 transmits the logic product output (output of AND gate 73) of output signals $DT_1$ and $DT_2$ to the output terminal thereof so that the pulse width equal to and greater than pulse width 2T is shortened.

In the case of a pulse width shortening mode for shortening pulse width 1T, the pulse width extending-shortening setting signal is set to logic signal "0". Thus, the inverted output of output signal $NR_1$ delayed by time $7\tau$ is selected by signal selecting circuit 62 and the polarity of output signal S is inverted. Accordingly, signal selecting circuit 63 performing the selecting operation by output signal S shortens the signal portion of pulse width 1T of Q-output signal $Q_4$ delayed by time $7\tau$, and extends the signal portion equal to and greater than pulse width 2T.

Thus, the signal portion of pulse width 1T is extended or shortened to a required extent. When such a construction is applied to a case in which the record disk is made of a metallic material, the pulse width of the record signal can be suitably narrowed in advance, thereby solving the problems that a record material is melted and the pit becomes wider than the pulse width of the record signal. When the record disk is made of a material having a preferable linearity in a dyemedia or magnetic-optical media, etc., pulse width 1T is suitably widened within the range of the unit bit length on the inner circumferential side of the disk so that it is possible to improve MTF in the optical system in the reading operation.

In the above-mentioned embodiment, the pulse width is increased or decreased within the range of the minimum time length with respect to minimum pulse width 1T of input digital signal A. However, a pulse width less than a predetermined pulse width, e.g. pulse width 2T, may be increased or decreased in the processing operation. In this case, pulse width 2T corresponds to the predetermined time length.

Further, a means for detecting the time length of the pulse signal is not limited to that in the above-mentioned embodiment. For example, a counter for counting the number of pulses to be measured, or a timer triggered by a pulse to be measured, etc., can be used to detect a pulse less than the predetermined bit length.

Further the pulse width can be more suitably adjusted by controlling the delay time of delay circuit 19 in accordance with the position of the pickup in the radial direction of the disk.

As mentioned above in the optical recording apparatus of the present invention, with respect to a pulse having a pulse width less than a predetermined pulse width in a series of pulse signals to be recorded onto a record medium the pulse width is extended or shortened within the minimum pulse width. Accordingly for example, it is possible to adjust the pulse width corresponding to the forming position of a pit of the record medium or the material of the record medium so that the pit having a suitable length is formed on the record medium. As a result, the contrast in reflected light of the pit in the pickup is restrained from being reduced and the output of the RF signal is thereby increased. Further, the interference between codes can be restrained from being caused as small as possible. Accordingly, the error in operation with respect to the data demodulation can be reduced, which is preferable in the apparatus.

What is claimed is:

1. An optical recording apparatus for recording pulse signals on an optical recording medium, said pulse signals comprising pulses of several bit lengths representing information content, said apparatus comprising:
 pulse signal time length detecting means for detecting a length of an input pulse and determining whether said input pulse is longer than a predetermined length, and for outputting a control signal, said control signal having at least one of a first level and a second level based on a length of said input pulse, said first level indicating said input pulse is longer than said predetermined length and said second level indicating said input pulse is shorter than or equal to said predetermined length;
 control signal receiving means for receiving said control signal from said pulse signal time length detecting means, and for determining a level of said control signal; and
 pulse length altering means, coupled to said control signal receiving means, for selectively extending the length of said input pulses when said control signal received by said control signal receiving means has said second level, and for shortening the length of said input pulses when said control signal outputted by said pulse signal time length detecting means and received by said control signal receiving means has said first level.

2. An optical recording apparatus as claimed in claim 1, wherein said recording medium has a plurality of recording positions in a radial direction of said recording medium for recording said input pulses thereon, and wherein a degree of extending and shortening said length of said input pulses is adjusted according to said recording positions of said input pulses on said recording medium in said radial direction of the recording medium.

3. An optical recording apparatus for recording pulse signals on an optical recording medium, said pulse signals comprising pulses of several bit lengths representing information content, said apparatus comprising:
 pulse signal time length detecting means for detecting a length of an input pulse and determining whether said input pulse is longer than a predetermined length, and for outputting a control signal having at least one of a first level and a second level based on a length of said input pulse, said first level indicating said input pulse is longer than said predetermined length and said second level indicating said input pulse is shorter than or equal to said predetermined length; means for setting one of a pulse width extending mode and a pulse width shortening mode by outputting a setting signal;
 control signal receiving means for receiving said control signal from said pulse signal time length detecting means, and for determining a level of said control signal; and
 pulse length altering means, coupled to said control signal receiving means, for selectively shortening the length of said input pulses when said control signal received by said control signal receiving means indicates said second level and said setting signal output by said setting means indicates said pulse width shortening mode, and for extending the length of said input pulses when said control signal outputted by said pulse signal time length detecting means to said control signal receiving means has said first level and said setting signal output by said setting means indicates a pulse width shortening mode.

4. An optical recording apparatus as claimed in claim 3, wherein said recording medium has a plurality of recording positions in a radial direction of said recording medium for recording said input pulses thereon, and wherein a degree of extending and shortening said length of said input pulse is adjusted according to said recording positions of said input pulses on said recording medium in said radial direction of the recording medium.

5. An optical recording apparatus for recording pulse signals on an optical recording medium, said pulse signals comprising pulses of several bit lengths representing information content, said apparatus comprising:

pulse signal time length detecting means for detecting a length of an input pulse and determining whether said input pulse is longer than a predetermined length, and for outputting a control signal having at least one of a first level and a second level based on the length of said input pulse, said first level indicating said input pulse is longer than said predetermined length and said second level indicating said input pulse is shorter than or equal to said predetermined length;

signal selecting means for receiving a setting signal and said control signal from said pulse signal time length detecting means and determining a level of said control signal, and for outputting a selection signal based on the level of said control signal and based on said setting signal for setting one of a pulse width extending mode and a pulse width shortening mode; and pulse length altering means, coupled to said signal selecting means and responsive to said control signal and said selection signal, for selectively extending or shortening the length of said input pulses;

wherein, in a pulse width extending mode, said pulse length altering means extends the length of said input pulses when said control signal received by said signal selecting means has said second level, and shortens the length of said input pulses when said control signal outputted by said pulse signal time length detecting means and received by said signal selecting means has said first level; and wherein, in a pulse width shortening mode, said pulse length altering means shortens the length of said input pulses when said control signal received by said signal selecting means has said second level, and extends the length of said input pulses when said control signal received by said signal selecting means has said first level.

6. An apparatus as claimed in claim 5, wherein said selection signal is a bi-valued logic signal and said pulse length altering means comprises:

first logic circuit means, receiving said control signal and said selection signal, for outputting said control signal in one of inverted form and uninverted form depending on the logic value of said selection signal, and second logic circuit means responsive to said one of said uninverted and inverted control signal, respectively, for altering the length of said pulses of predetermined or lower length in a direction dependent upon whether said control signal is inverted or uninverted.

7. An optical recording apparatus as claimed in claim 5, wherein said recording medium has a plurality of recording positions in a radial direction of said recording medium for recording said input pulses thereon, and wherein a degree of extending and shortening said length of said input pulses is adjusted according to said recording positions of said input pulses on said recording medium in said radial direction of the recording medium.

8. An optical recording apparatus as claimed in claim 5, wherein a degree of extending and shortening said length of said input pulses is adjusted according to a type of material of said optical recording medium.

* * * * *